United States Patent [19]
Marshall

[11] 3,804,116
[45] Apr. 16, 1974

[54] HYDRAULIC VALVES
[75] Inventor: John Stephen Marshall, Woking, England
[73] Assignee: Sperry Rand Limited, London, England
[22] Filed: Jan. 10, 1973
[21] Appl. No.: 322,398

[30] Foreign Application Priority Data
  Jan. 14, 1972  Great Britain...................... 1802/72

[52] U.S. Cl. .............................................. 137/596
[51] Int. Cl. .......................................... F16k 11/00
[58] Field of Search............ 137/596, 596.2, 596.13, 137/596.12, 596.1

[56] References Cited
UNITED STATES PATENTS
| | | | |
|---|---|---|---|
| 2,745,433 | 5/1956 | Schneider et al. .............. | 137/596.13 |
| 3,460,567 | 8/1969 | Martin ................................ | 137/596 |
| 3,506,031 | 4/1970 | Stacey................................ | 137/596 |
| 3,313,316 | 4/1967 | Thomas ...................... | 137/596.12 X |

Primary Examiner—Henry T. Klinksiek
Assistant Examiner—Robert J. Miller
Attorney, Agent, or Firm—Barnes, Kisselle, Raisch & Choate

[57] ABSTRACT

A spool type control valve provided with two bores arranged for the insertion of auxiliary valves, each bore having a port communicating with one of the outlet ports of the control valve pair, and each having a vent to tank, the inner ends of the bores being connected by a passageway. Preferably the vents to tank also communicate with ports in the control valve bore. If the outer ends of the two bores are sealed off by caps, the control valve has its outlet ports vented to tank and functions in the usual way. However, by inserting auxiliary valves in one or both bores, and in some cases also using a modified spool, the control valve functions with additional facilities, for example, the auxiliary valve may be a counterbalance valve in one or both sides of the circuit, a speed-limiting valve to control the maximum speed of movement of the load, a cross-line relief valve, or a valve to allow regenerative operation in a loader circuit.

5 Claims, 6 Drawing Figures

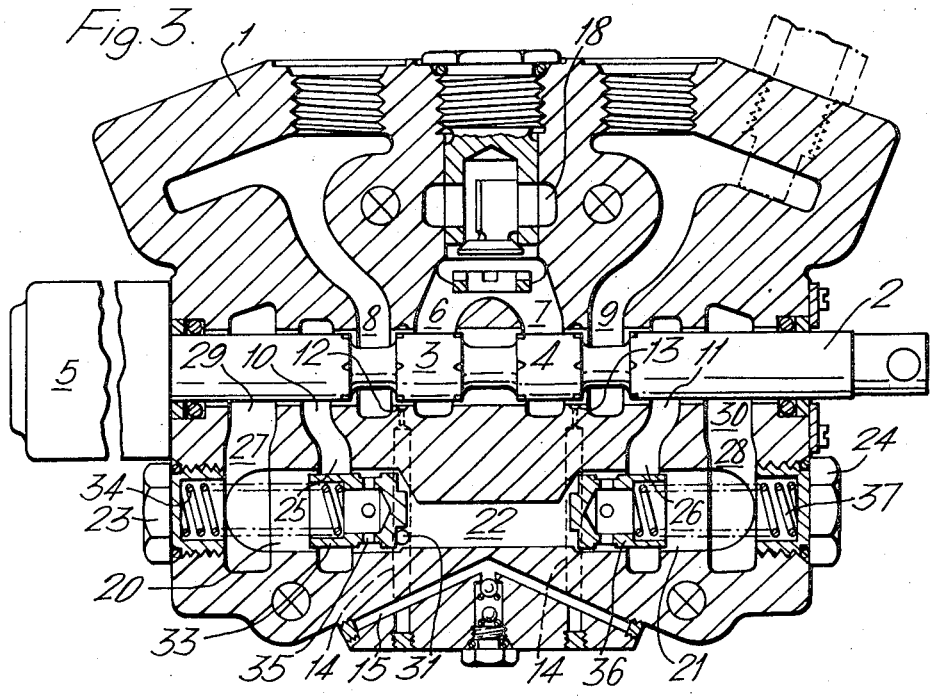
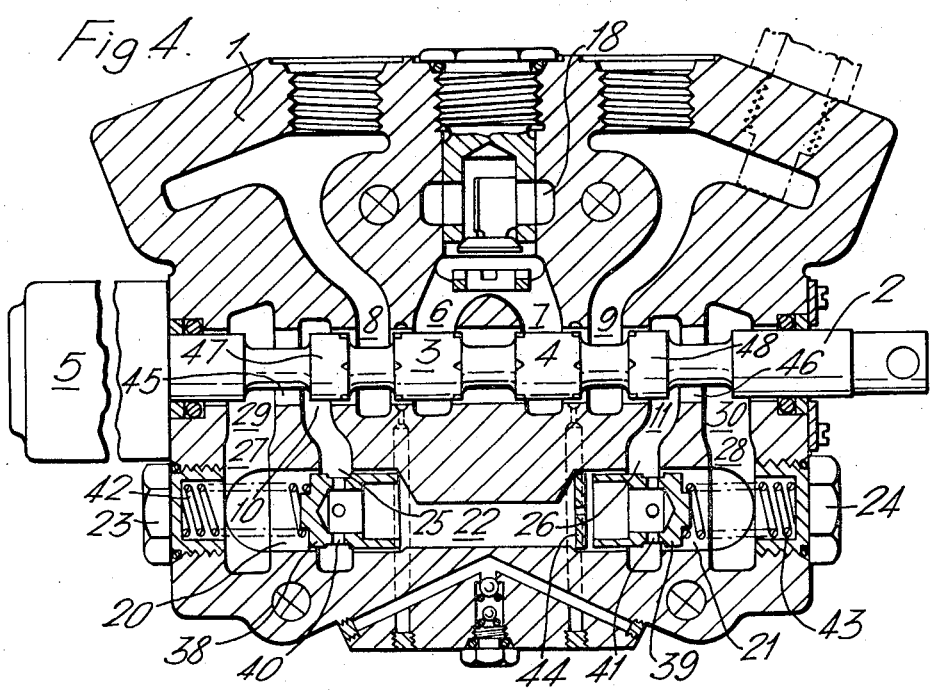

HYDRAULIC VALVES

The invention relates to hydraulic control valves of the spool type. Control valves of this kind comprise a valve body with a bore within which is an axially slidable spool having raised lands. The bore of the valve is provided with one or more high pressure ports, a pair of service ports for connection to the load to be controlled, and a pair of outlet ports which normally are vented direct to tank. By sliding the spool from its central neutral position in one direction or the other, one of the service ports is put into communication with the high pressure inlet and the other is vented by way of the outlet port to tank. Such valves may be provided with load-sensing grooves communicating with load-sensing passages. When the valve is operated, one service port is put into communication with a load-sensing groove before supply pressure is admitted, and the load pressure thus sensed may be used to control the supply of high pressure fluid to the valve, for example, by being applied to control the swash angle of a variable delivery swash-plate pump.

The present invention provides a modification of the above type of valve, by means of which additional facilites can be provided at relatively low cost.

According to the present invention, a spool type control valve of the above kind is provided with two bores arranged for the insertion of auxiliary valves each bore having a port communicating with one of the outlet ports of the control valve pair, and each having a vent to tank, the inner ends of the bores being connected by a passageway. Preferably the vents to tank also communicate with ports in the control valve bore.

If the outer end of the two bores are sealed off by caps, the control valve has its outlet ports vented to tank and function in the usual way. However, by inserting auxiliary valves in one or both bores, and in some cases also using a modified spool, the control valve functions with additional facilities, for example, the auxiliary valve may be a counterbalance valve in one or both sides of the circuit, a speed-limiting valve to control the maximum speed of movement of the load, a cross-line relief valve, or a valve to allow regenerative operation in a loader circuit. In some cases modification of the spool lands may also be necessary.

The invention will be further described by way of example with reference to the drawings accompanying the Provisional Specification in which:

FIG. 3 is a section through a valve similar to that of FIG. 2, but provided with a pair of counterbalance valves effective for both directions of operation.

FIG. 4 is a section through a similar valve provided with a pair of flow limiting valves to limit the maximum rate of movement of the load.

FIG. 5 is a section through a valve designed for use in a loader circuit to permit regenerative flow from one side to the other of the ram when the bucket is lowered, and FIG. 6 is a section through a further valve according to the invention provided with auxiliary cross-line relief valves.

Figure 1:
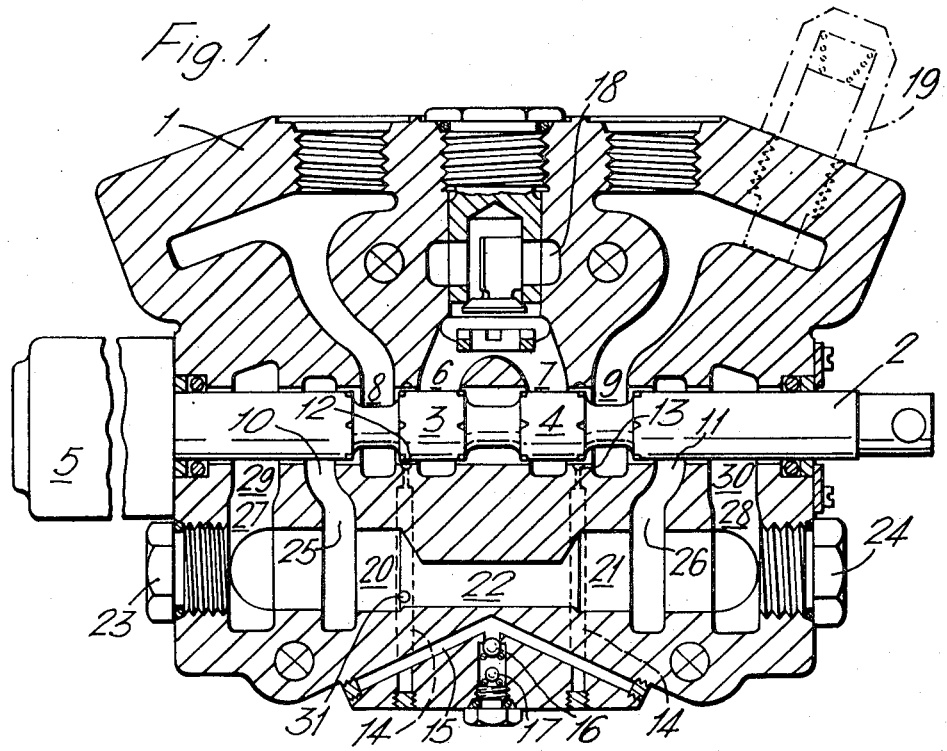
FIG. 1 is a section through a valve according to the invention showing the bores and their connecting passageway.

Referring first to FIG. 1, the valve is shown in longitudinal section, and consists of a cost iron valve body 1 having a bore within which slides a spool 2 provided with raised lands 3 and 4. The lands are provided with inching grooves in known manner. A spring and detent mechanism 5 returns the spool to its central neutral position after operation. The valve is provided with a pair of high pressure inlet ports 6 and 7, a pair of service ports 8 and 9 for connection to the load to be controlled which may, for example, be a hydraulic ram controlling the jib of a mobile crane, and a pair of outlet ports 10 and 11 through which fluid is vented to tank. Sensing grooves 12 and 13 communicate with passages 14, 15 in the body of the valve for sensing the load pressure, and this pressure is applied through a non-return valve 16 to a vent 17 which is connected when the valve is in operation to a control device for the pump compensator. The compensator control also includes a small orifice to tank.

The high pressure fluid for the valve is applied via a gallery 18 to the high pressure ports 6 and 7. Optionally, a relief valve indicated by the dotted outline 19 may be included in one or both of the service galleries.

In accordance with the invention, the valve body is also provided with a pair of bores 20, 21 connected together at their inner ends by a passageway 22, and sealed at their outer ends by screwed caps, 23, 24. The bores 20, 21 are respectively provided with ports 25, 26 connected by galleries with the outlet ports 10, 11 of the control bore, and with galleries 27, 28 vented to tank. These galleries also lead to additional tank ports 29, 30 in the central bore which are not employed in the embodiment of FIG. 1, but are required for some eobodiments of the invention, as will appear below. For some purposes a loading-sensing connection 31 (shown dotted) may be required between the passages 14 and the bores 20, 21.

The valve as so far described with reference to FIG. 1, but without the connection 31, functions normally as a control valve, fluid being applied if the spool is moved, for example, to the left from the supply ports 7 to the service port 9 and being vented from the service port 8 through the output port 10, the port 25, the bore 20 and the passage 27 to tank, and also via passageway 22 to bore 21 and the passage 28 to tank.

Figure 2:
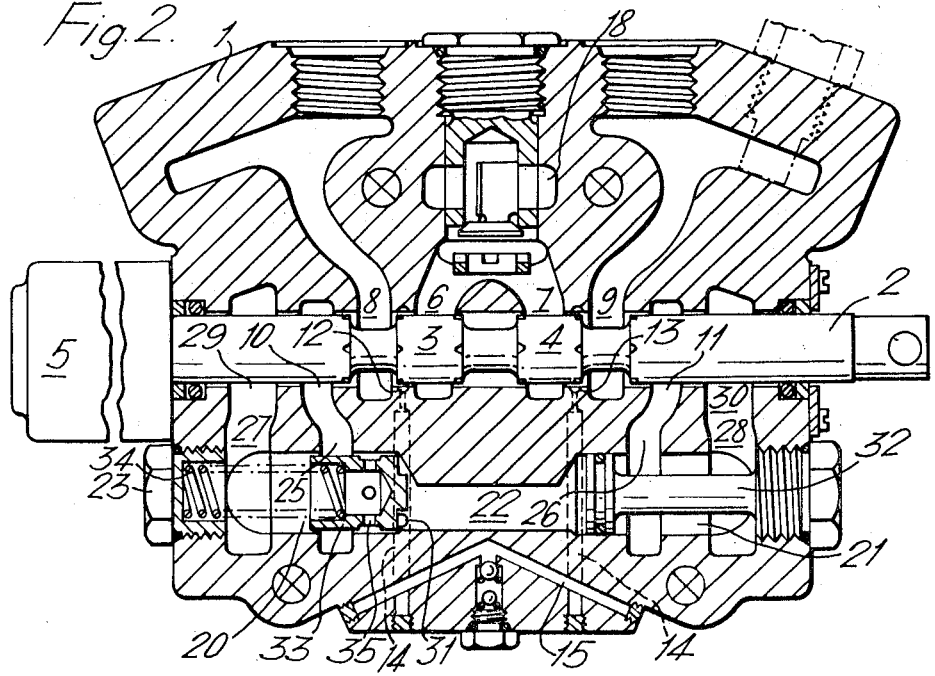
FIG. 2 is a section of the same valve having a stopper inserted in one bore, and a piston valve in the other to function as a counterbalance valve.

The valve of FIG. 1 may be adapted, by the insertion of auxiliary devices into the bores, to provide various facilities. FIG. 2 shows a single-sided counterbalance valve. Referring now to this Figure, the screw cap 24 is replaced by a stopper 32 which seals off the inner end of the bore 21 from the passage 22, leaving the port 26 directly connected to tank via the gallery 28. In the bore 20 a valve is inserted comprising a piston 33 biassed by a spring 34 to a position in which it seals the port 25 and so cuts off the flow from the outlet port 10 to the gallery 27. The piston 33 is drilled with passages 35, so that when it moves to the left against the spring 34 fluid can flow through these passeges from the port 25 to the tank gallery 27. A connection 31 is established between the load sensing gallery 14 and the passage 22.

In operation of this valve, if the control valve spool is moved to the left it first uncovers the load-sensing groove 13, causing the load pressure at the service port 9 to be applied to the passage 22 and forcing the piston 33 to the left against the action of the spring 34. This opens a connection between the outlet port 10 and the gallery 27 by way of the passages 35, allowing fluid to flow as required from the service port 8 to tank. Further movement of the valve spool progressively uncovers the high pressure port 7, admitting high pressure fluid to the service port 9 and so operating the load.

Should the load tend to run away, the pump is no longer able to supply fluid at a sufficient rate, and the sensed load pressure in the passages 14 and 22 falls. The spring 34 then pushes the piston 33 towards the right, checking the flow of fluid from the outlet port 10 and so slowing down movement of the load until the load-sensing pressure is again sufficient to overcome the spring 34. Movement of the valve spool in the opposite direction, that is, to the right, applies pressure from the high pressure port 6 to the service port 8. Fluid from the service port 9 can be freely vented to tank through the outlet port 11, the portion of the bore 21 beyond the stopper 32, and the gallery 28. There is thus no counterbalance valve effect for this sense of movement.

FIG. 3 shows an arrangement similar to FIG. 2, but in this case having a counterbalance valve in each bore. In this case the bore 21 also contains a valve comprising a piston 36 and spring 37 exactly similar to the valve in the bore 20 described above. The sensing of load pressure in either direction of movement pushes the two pistons 33, 36 outwards, allowing the outlet ports 10 and 11 to be vented to tank via the galleries 27, 28. Both of these outlets are throttled if, during operation of the valve, the load pressure falls to such an extent that it is incapable of overcoming the force of the springs 34 and 37. The operation of these valves is similar to that described above with reference to FIG. 2.

FIG. 4 shows a valve according to the invention arranged for flow control so as to limit the speed of movement of the load. For example, in the case of the hydraulically operated mobile crane the luffing movement of the jib may be controlled so as to limit the speed at which it can be lowered.

In FIG. 4, the two bores 20, 21, each contain a valve comprising a piston 38, 39, having fluid passages 40, 41 and urged by a spring 42. 43 into a position in which it allows fluid to pass from the port 25, 26 into the passageway 22. There is no connection between the passageway 22 and the loadsensing passages, if any, provided in the valve. One of the bores, 21 also contains an orifice plate 44 with an orifice of suitable dimensions for the required flow. A slight modification of the control spool is also required for this valve, the spool being cut away at 45 and 46 to provide an additional pair of lands 47, 48.

If the valve spool is moved to the left, fluid is supplied from the high pressure port 7 to the service port 9, and fluid is allowed to vent to tank from the service port 8, by way of the outlet port 10, the port 25, the piston passages 40, the passageway 22, orifice plate 44, passages 41 in the piston 39 and the port 26. From here it flows past the cut-away portion 46 of the control spool and is vented to tank via the port 30, and passage 28.

Should the flow increase to the point at which the pressure drop across the orifice plate 44 is sufficient to overcome the force of the spring 42, the piston 38 moves to the left, throttling the flow at the port 25 until the pressure drop across the orifice just counterbalance the spring force, and so limiting the flow out of the valve to a limit set by the size of the orifice. An exactly similar effect takes place at the piston 39 if the control spool is moved to the right.

Often speed limitation is only required for one sense of movement, in which case one of the pistons 38, 39 with its associated spring may be omitted.

Figures 5, 6:
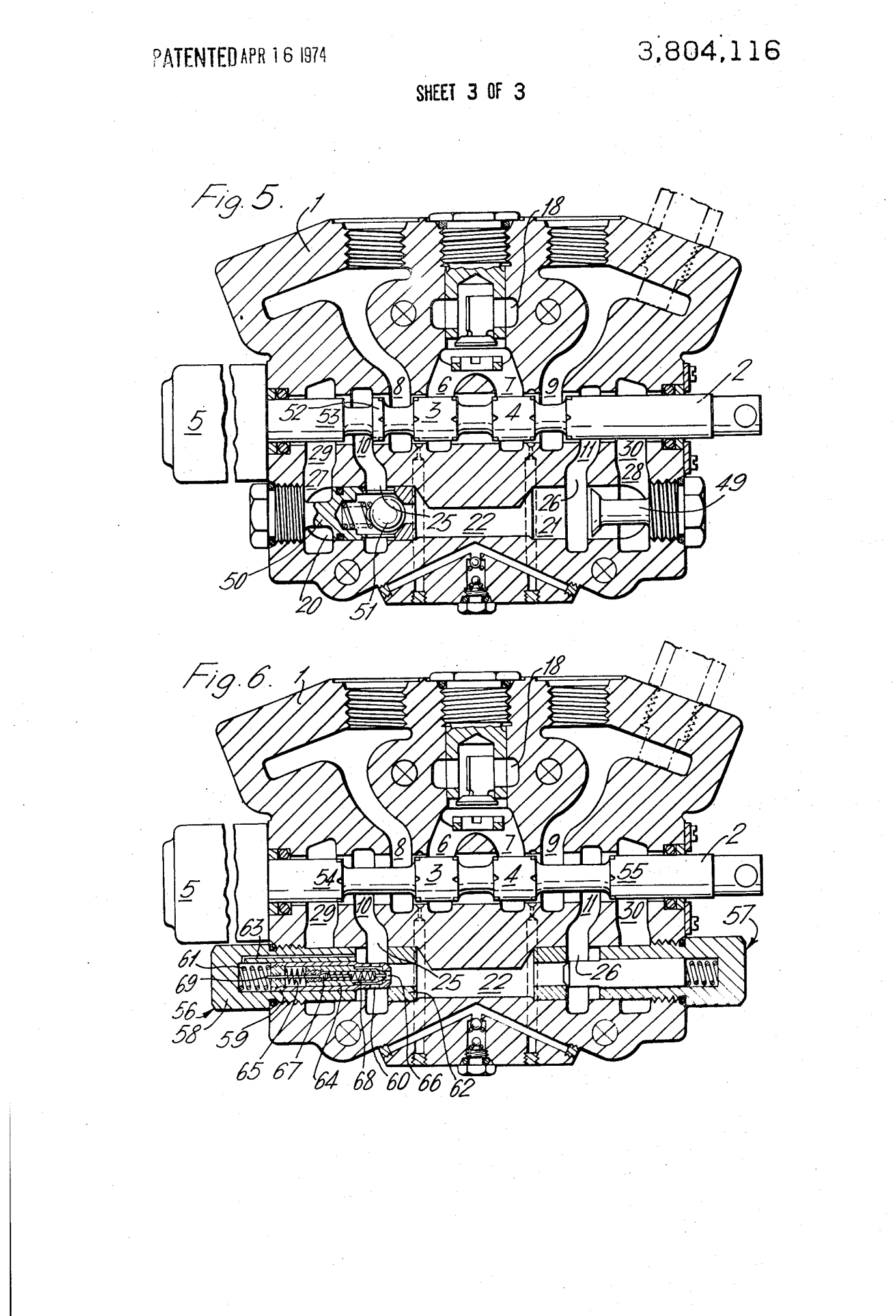

FIG. 5 is a valve in accordance with the invention for use in a loader circuit. This valve is intended for use in earth-moving equipment and provides for regenerative flow from one side to the other of the ram when the ram is retracted to lower the bucket.

The valve is of the kind generally described with reference to FIG. 1, but in the bore 21 there is inserted a restrictor 49 which may take the form of a plug carrying a knife-edged restrictor blade. In the bore 20 is a lantern 50 containing a lightly loaded check valve 51. This permits flow of fluid from the passage 22 to the port 25, but not in the reverse direction. The lantern seals the tank gallery 27 from the port 25. In this valve the spool 2 is also modified by being cut away to provide a narrow land 52 and an edge 53. In the neutral position of the valve the narrow land 52 seals the service port 8 from the outlet port 10, and the edge 53 just closes the tank port 29. There is no connection between the passageway 22 and the loadsensing passages, if any.

In operation of this valve the spool is moved to the left to raise the bucket, admitting pressure from the pressure port 7 to the service port 9, and allowing fluid from the other service port 8 to vent to tank through the port 29, uncovered by movement of the edge 53, and spool land 52 which centres axially in passage 10.

To lower the bucket the spool is moved to the right. As the pressure port 6 is uncovered, fluid under pressure is admitted to the service port 8, and fluid from the service port 9 passes into the outlet port 11. This is greater in volume than the pressure fluid supplied to the port 8, because of the difference in area of the two sides of the ram, and furthermore, it is under appreciable pressure because of the weight of the empty bucket acting on the ram. This fluid under pressure passes along the passageway 22 and through the ball valve 51 whence it enters the port 10, and so passes to the service port 8 together with the pressure fluid from the pressure port 6 since the land 52 is relatively narrow, and the movement of the spool causes it to uncover the port 8. The excess fluid escapes past the restrictor 49 to tank via the gallery 28, the restrictor controlling the maximum speed at which the bucket can drop.

When the bucket rests on the ground, the return flow from the service port 9 ceases and the restrictor allows pressure in the passageway 22 to return substantailly to tank pressure, whereupon the ball valve 51 re-closes. Pressure fluid from the port 6 continues to be applied to the ram, since the ball valve 50 and the edge 53 seal the high-pressure side of the valve from the tank.

FIG. 6 shows a control valve according to the invention in which the auxiliary bores are used to accommodate a pair of cross-line relief valves. The valve is of generally similar construction to that shown in FIG. 1, but the spool is modified, being cut away outside the lands 3 and 4 so as to provide a pair of edges 54, 55 which in the neutral position of the valve just close the ports 29 and 30 which vent to tank. The ports 10 and 11 which, in the embodiments of the valve described with reference to FIGS. 1, 2 and 3, serves as outlet ports, are thereby permanently connected to the service ports 8 and 9.

Into the bores 20, 21 are screwed a pair of anti-cavitation and cross-line relief valves 56, 57. These valves are of similar construction and normally serve to isolate the ports 10, 11 from the passageway 22. On the occurrence of an excessive pressure at one of these ports the valve associated with that port, which is pilot operated, opens allowing fluid to flow from the passageway 22 past the other valve and so out to tank.

The two valves are similar in construction and one of them 56, which is shown in section in the Figure, will now be described in detail.

The valve 56 comprises a valve body 58 so shaped that it can be screwed into the bore 20. Within the valve body is a piston in the form of a sleeve 59 drilled with passages 60 at its outer end and lightly loaded with spring 61 against a seating 62 so as to seal the end of the passageway 22. The small passage 63 in the body 58 of the valve allows the pressure at the ports 10 and 25 to be applied also to the rear of the sleeve 59, which is of greater area than the seating 62 so that by reason of the difference in areas and the force of the spring, the valve is normally held firmly on its seating.

Within the sleeve 59 is a further sleeve also forming a piston 64, spring-loaded by a spring 65 so that sleeve closes an aperture 66 in the end of the outer sleeve 59. This sleeve in turn contains a small pilot valve 67 loaded by a spring 68, the compression force of which determines the pressure at which the valve will open. Passages in the sleeve 59 and 64 allow the pressure in the passageway 22 to be applied to the low pressure side of the main valve 64, and a further set of passages allow the pressure on the inner side of the sleeve 59 to be applied to the high pressure side of the pilot valve 67. These latter set of passages contain a rod 69 which is a sliding fit in the passages and normally rests against the tip of the pilot valve 67.

In operation the valve spool 2 is moved in one sense of the other placing one of the service ports 8 or 9 in communication with the high pressure in the port 6 or 7 and the other in communication with a port 29 or 30 connected directly to the tank.

Because of the relatively light pressure of the spring 61 the sleeve 59 seated on its seat 62 acts as a non-return valve, and since in operation one or other of the ports 10, 11 will normally be a tank pressure, pressure in the passageway 22 is normally also at or near tank pressure.

Suppose the valve is operated by moving the control spool 2 to the right. This places the service port 8 in connection with the high pressure port 6, and the service port 9 is vented to tank by way of the port 30. The pressure at the port 10 therefore rises to the full load pressure. When the pressure at the port 10 rises it is applied to both sides of the sleeve 59 and so long as the pilot valve 67 remains closed the sleeve 59 remains firmly on the seating 62 and the control valve operates normally as previously described, with the ports 29 and 30 acting as the tank ports.

In normal operation therefore the valves 56 and 57 remain closed and no fluid passes through the ports 10, 11. However, suppose the pressure should rise to such extent as to open the pilot valve 67. The rod 69 is then carried forward and the flow through the annular space round the rod which is a loose fit in the fluid passages allows the pressure to fall behind the piston sleeve 64. The pressure transmitted by the rod delays re-closing of the pilot valve 67 and the falling pressure behind the sleeve 64 causes the sleeve to move backwards away from its seating in wich it closes the passage 66. This opens the connection between the port 10 and the passageway 22 through which the high pressure fluid can escape, pressing back the relatively lightly loaded valve 57 which, as stated above, acts as a one-way valve, and permitting fluid to escape to tank by way of the ports 26, 11 and 30, this latter port being now uncovered by the movement of the spool.

What we claim is:

1. A control valve comprising an axially slidable spool with raised lands in a bore within the valve body provided with at least one high pressure port, a pair of service ports for connection to a load, and a pair of outlet ports, the valve being provided with two bores for the insertion of auxiliary valves, each bore having a port communicating with one of the outlet ports of the control valve, and each having a vent to tank, the inner ends of the bores being connected by a passageway, said vents also communicating with ports in the control valve bore.

2. A control valve according to claim 1 further provided with load-sensing passages having a connection to the passageway, having a spring-loaded piston valve inserted in at least one of the bores and biased so as to seal the outlet port from the tank gallery until the load pressure is sufficient to overcome the spring bias.

3. A flow control valve comprising a valve according to claim 1 further characterised in that the valve spool has cut-away portions leaving raised lands which, in the neutral position of the valve, allow the outlet ports to communicate with the tank ports, a restrictor being inserted between the bores and a normally open spring-loaded piston valve being inserted in at least one of the bores so that when the return flow to tank through the restrictor produces a pressure exceeding the spring load the piston valve closes to limit the out-flow to tank.

4. A loader circuit valve comprising a control valve according to claim 1 in which the spool is cut away at one end of the valve to leave a narrow land which, in the neutral position of the valve, seals the service port from the outlet port and also has an edge closing the tank port the bore on that side of the valve carrying a check valve sealing the tank gallery from the port but allowing flow from the passage to the outlet port, and having a restrictor inserted in the bore at the other end of the valve between the outlet port of the valve and the tank gallery.

5. A control and cross-line relief valve according to claim 1 in which the outer lands of the spool are so disposed that their edges seal the tank ports when the spool is in the neutral position, and cross line relief valves are inserted in the bores so as to open under excess pressure at one of the outlet ports and vent the excess pressure to tank via the passageway and the other of the outlet ports and its tank port.

* * * * *